May 18, 1926.                    1,585,447
E. L. WEBB
EXTRACTION FLASK
Filed Oct. 14, 1922
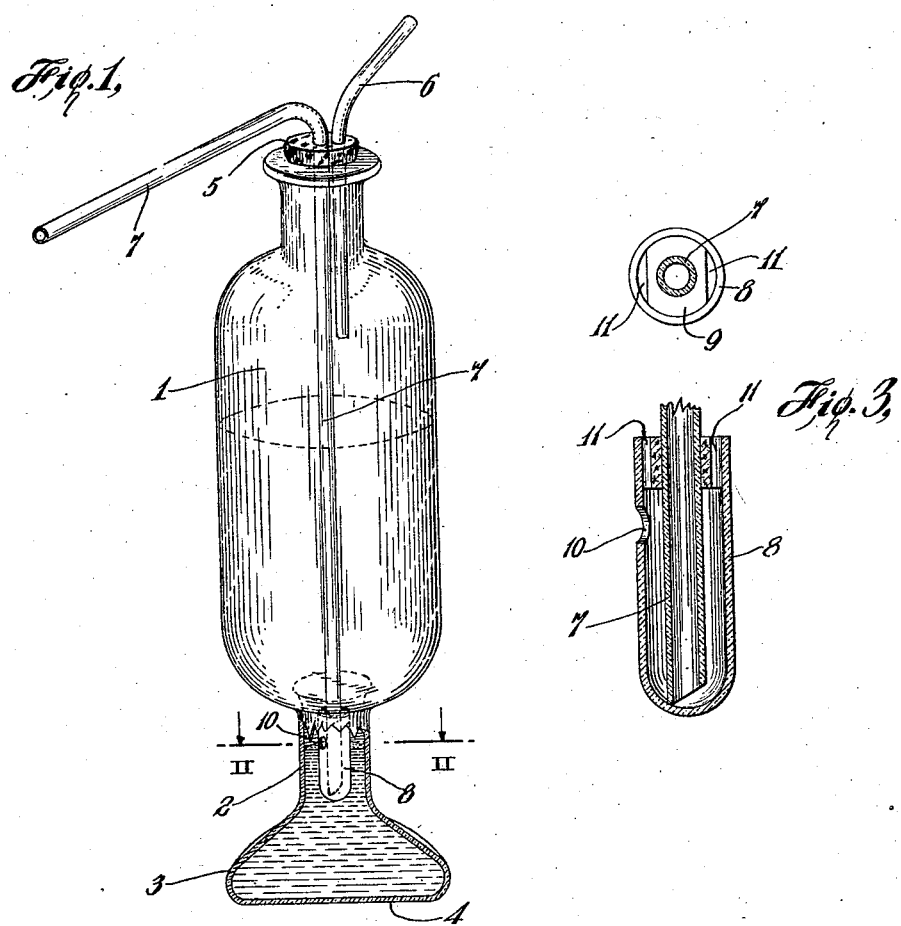
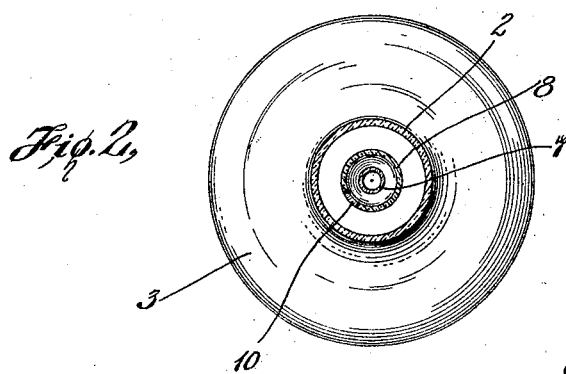
INVENTOR
BY Edward L. Webb
Benj. R. Johnson
ATTORNEY Patented May 18, 1926.

1,585,447

UNITED STATES PATENT OFFICE.

EDWARD L. WEBB, OF CORTLAND, NEW YORK.

EXTRACTION FLASK.

Application filed October 14, 1922. Serial No. 594,669.

My invention relates to an extraction flask in the nature of precision apparatus for the separation as completely as possible of two mutually contacting liquids of different specific gravity as a step in the exact quantitative measurement of solid material in solution or suspension in one of them. The device thus has a considerable range of utility since the performance of the function stated is requisite to the carrying out of various processes, but its primary use is in fat determination by the well-known Rose Gottlieb process which is applied to milk, cream, condensed milk, to ice cream more or less tentatively, and with modifications to the routine determination of fat in a greater variety of materials such as malted milk, powdered milk, powdered buttermilk, cheese, butter, chocolate and cocoa. This process consists essentially in placing all the non-fatty materials in solution by the successive employment of water (where the sample to be analyzed is not liquid enough), ammonia, and alcohol and thereafter shaking into the mixture a certain amount of ethyl ether and then a like quantity of petroleum ether, agitating the mixture to induce the dissolving out of the fat from the water ammonia and alcohol mixture and the rising of the ethereal solution to the upper portion of the vessel which it readily does being lighter than the water ammonia and alcohol mixture and but slightly miscible therewith, so that the liquids assume the relation of distinct layers with a well defined line or plane of demarcation between them at their junction. Then follows the removal of the top layer as completely as possible and with as entire exclusion as may be of the lower layer, and the boiling down of the liquid thus removed to leave the extracted fat as residue, the extraction being repeated with fresh additions of ether once or even twice should that be necessary to insure complete removal of the fat.

If speed of operation be an object the separation of the two layers mentioned may be effectively hastened by centrifugal means, provided the extraction is conducted in a suitable vessel.

This process prescribes certain characteristics in the vessel in which it is to be carried out, first, there must be adequate space for intimate mixing of the liquids, the greater part of the vessel being to that end of considerable internal dimensions, and, second, the part of the vessel where the two layers meet must be restricted to limit the common surface to a small area in order that the separation of the layers may be as complete as possible, completeness of separation being increased by reducing the meeting area as will be apparent. Extraction flasks satisfying these two requirements are well known in the art, the original Mojonnier flask (now superseded by the later form) being an upright flask with a flat base and a restricted portion joining two parts of much greater diameter above and below said portion, and the new Mojonnier flask having the restricted portion and the parts of relatively great capacity connected thereby but being of peculiar shape and incapable of standing alone. The old form had a glass cross tube and cock leading off horizontally from the restricted part of the flask to act as a draw-off. This crosstube was subject to breakage and interfered with the handling of the flask and its setting down among other apparatus, prevented its treatment in a centrifuge, except by the use of a special carriage, and the cock was a fruitful source of trouble subject to leakage, or to sticking if tight enough not to leak. The new form of Mojonnier flask although requiring the special centrifuge put out for the purpose by the makers, and the use of a hook support in the analytical balance (if it is desired to weigh the sample in the flask) and in general necessitating greatly increased care in handling has nevertheless, as stated, superseded the old form, and this although it effects the separation of the layers by pouring off and not positively, and unless the plane of contact is at just the right level or is made so by very carefully adding water, leaves some of the upper layer in the flask.

My flask has the two features above shown to be essential, i. e., adequate space for intimate mixing of the liquids and limitation of the area of the common surface of the meeting layers of liquid by restriction of the part of the vessel where the junction occurs. It has also stability, standing up-right on its flat base upon any flat surface and may in consequence be weighed directly upon the pan of a balance without the use of a hook for suspending it over the pan. It has no awkward and fragile projecting side tube and is devoid also of the inefficient and unsatisfactory draw-off cock being provided instead with a separate removable device for accomplishing the draw-off of the ethereal solvent with its dissolved fat, this draw-off being positive in operation and eliminating the danger of loss encountered in pouring—that of possible running of the solvent down the outside of the neck of the flask. This draw-off is likewise adjustable and can be accommodated to any level within the narrowed portion of the flask at which the two layers may fall and give an almost complete separation. The positive and adjustable separating means is a water bottle blow-off of special construction, facilitating the separation and making it an operation of great nicety, accuracy and completeness, as well as of comparative ease, which is important since it is at all times highly desirable to secure as much as possible of the solvent from the first extraction. So complete a recovery as I am able thus to effect makes it possible in some control work to dispense with a second extraction.

If it is desired to hasten the separation of the ethereal and lower layer (and time is an important factor in laboratory practice) my flask is so proportioned that it fits in the carriage of a Babcock centrifuge so with it the tester may avail himself of this time-saving operation without a specially constructed centrifugal machine.

Referring to the drawing which shows the preferred form of the invention and in which—

Fig. 1 is a perspective view partly in section of my flask with the best form of blow-off known to me in place therein.

Fig. 2 is a horizontal section on the line II—II Fig. 1, and

Fig. 3 is an enlarged detail vertical section of the lower end of the blow-off tube and trap, including also a sectional plan of the top.

In the preferred form of my flask thus illustrated the upper portion 1 of great capacity provides ample mixing space for the liquids, and the constricted portion 2 in communication therewith limits the area of mutual contact, the junction of the layers of liquids of different specific gravity being located therein, and the portion 3 in the base furnishing further mixing space also in communication with the restricted portion 2 and thereby with portion 1. Stability of the upright flask is insured by the flat base 4, and the general convenience and utility of the apparatus is promoted by conforming it as closely as may be to the usual shape of small water bottles and other small bottles in laboratory use.

In the flask thus described, when rendered tight by the insertion of a close-fitting cork stopper, the sample from which the fat is to be extracted is agitated successively with additions of water (if necessary) ammonia, alcohol, ethyl and petroleum ethers, according to the Ross Gottlieb procedure. Separation of the layers is effected either by allowing flask and contents to stand quietly for some time or by centrifugal force.

When the separation of layers has been effected, by reason of the proportions of the flask and the relative amounts of the materials used, the water, ammonia and alcohol with their solution of non-fatty solids will fill substantially the lower enlarged portion of the flask, the ethers with their dissolved fat will occupy a considerable portion of the upper enlarged part and extend down into the restricted portion to meet the heavier layer.

The stopper used during the agitation with the solvents and still in place during the separation of the layers (by gravity or centrifugal force), is removed on the completion of these steps and a water bottle blow-off is then carefully introduced in its stead. The blow-off has the cork 5, blow tube 6 and blow-off or draw-off tube 7 on the lower end of which is first slipped the trap 8, which is a diminutive test tube with a closed bottom and having a stopper 9 in its upper end, and provided with an inlet 10, which is by sliding the blow-off tube 7 in cork 5 carefully located at the bottom of the upper layer closely adjacent the common surface of the contacting layers. Vents, or a vent, 11 are provided—most conveniently in the stopper—but if preferred in the glass of the trap above the inlet 10. It will be observed that the blow-off pipe extends almost or quite into contact with the bottom of the trap being bevelled upward from the contacting edge.

The blow-off operation is conducted as follows:

The blow-off having as described been introduced the trap 8 is if need be lowered by sliding tube 7 in stopper 5 until opening 10 lies immediately above the junction of the layers within the restricted portion of the flask. (If the junction has fallen slightly below the restricted portion, the trap by displacement will force the meeting point upward into said restricted portion.) The ethereal layer entering opening or port 10 fills the trap 8 and tube 7 to a point approximating the upper level of this layer in the larger widened portion of the flask. Air pressure is created by blowing in tube 6 and the ethereal solution of fat forced out through tube 7 into whatever vessel is to be used for the boiling-off of the solvent. Because the outer end of tube 7 can be placed well within the vessel to which transfer is made, the danger of loss of solvent (and consequently fat) is too remote to consider. The tube and trap are blown clear. The flask may easily be constructed of such proportions that the withdrawal means will force the junction no higher than the restricted portion of the flask.

Adherence to the proper proportions of solvents therefore enables the location of the junction of the layers to be closely determined in advance. It may thus be made to fall in the first instance, i. e., before the level of the junction is raised by insertion of the trap, at any point in the restricted portion sufficiently below its upper end to prevent the junction being raised by the trap into the wider portion, or at any point below the restricted portion near enough its lower end to enable the trap to raise the junction into the restricted portion. This gives a considerable range of variation amply sufficient to take care of changes introduced by ordinary slight deviations from the prescribed amounts of the solvents such as may occur in the hurry of routine work so that the junction of the layers always falls in the first instance at such a point that the ultimate junction will be located in the restricted portion. It will thus be apparent that with the means for separating which I employ, it is immaterial in what part of the constricted portion of the flask the ultimate junction of the layers fall. This it will be recalled is not true of either Mojonnier flask, in both of which on the contrary it is necessary that the junction be brought to just the right point if accurate separation, the object in view, is to be attained.

This trap has several important advantages; (1) it displaces liquid in the restricted portion and thereby reduces the area of contact of the layers and thus promotes completeness of separation; (2) it tends to prevent accidental removal of the lower layer; (3) it acts as follows: with each extraction there is a lowering of the heavier lower layer occasioned by partial passing of the alcohol into the ether. When its surface sinks below the narrow portion, the trap by displacing this lowered, heavier layer forces its upper level back into the narrowed section of the flask where it must lie if the separation is to be effected in the effective manner described.

The greater exactness and nicety of operation secured by use of the trap frequently enables a single extraction to achieve such accuracy and completeness of separation as to permit a flat allowance for a second extraction without actually conducting the extraction—a procedure which, while not commended for great accuracy, will often be of great advantage in quick control work. It will be understood that precision, speed and robustness cover the ground of excellence in apparatus of this nature, and that every coincident advance in all three of these characteristics is of the greatest moment, an advance in precision alone being of itself important but when joined with the other two decisive.

The total height of the flask approximates that of the Babcock test bottle and the greater diameter can vary but little from the diameter of such a bottle for the reason that a snug fit in a Babcock test centrifuge is to be secured. The diameter of the constricted portion may be about a half-inch, this being in effect reduced by the trap, but this dimension is given for purposes of illustration not restriction.

Claims:

1. An extraction flask having a relatively large liquid-containing space of considerable cross-sectional area and a portion materially restricted in cross-sectional area in communication therewith adapted to receive the junction of layers of liquids of different specific gravity and thereby limit the area of the common surface of such contacting layers for the more perfect separation of the same, and means mounted in and supported by the flask and extending into said portion of restricted cross-sectional area and into the lower layer, for forcing substantially the entire upper layer out of the flask without material admixture therewith of the lower layer.

2. An extraction flask having its upper portion of relatively great internal diameter and a constricted tubular portion of small internal diameter located below the portion of great internal diameter, in communication therewith and adapted to receive the junction of layers of liquids of different specific gravity and thereby limit the area of the common surface of such contacting layers for the more perfect separation of the same, and means for forcing substantially the entire upper layer out of the flask without material admixture therewith of the lower layer, said means having a substantial displacement and extending into the heavier liquid thereby raising the level of the junction of the liquids, the internal proportions of the flask being so related to the prescribed amounts of solvents used including ordinary slight deviations therefrom and to the displacement of said means as to locate the ultimate junction of the layers always within the restricted portion of the flask.

3. An extraction flask having a relatively large liquid containing space and a restricted portion in communication therewith adapted to receive the junction of layers of liquids of different specific gravity and thereby limit the area of the common surface of such contacting layers for the more perfect separation of the same, and means for removing the upper layer extending into said restricted portion to a point below the level of the lower layer and below the inlet to said means for the lighter liquid and by displacement of liquid in the restricted portion further limiting the area of the common surface of the contacting layers.

4. An extraction flask having two relatively enlarged liquid-containing portions and a restricted passage placing said portions in communication and adapted to limit the area of the common surface of contacting layers of liquid of different specific gravity meeting therein, and a water bottle blow-off, the inlet of whose blow-off pipe causes a substantial displacement of liquid in the restricted portion and is adjustable to substantially the bottom of the upper layer closely adjacent the plane of separation of said layers whereby practically the entire upper layer may be removed substantially without removal of the lower layer.

5. An extraction flask having a relatively large liquid-containing space and a restricted portion in communication therewith adapted to receive the junction of layers of liquids of different specific gravity and thereby limit the area of the common surface of such contacting layers for the more perfect separation of the same, a stopper for the mouth of said flask, and a vented-trap-carrying tube slidably mounted in said stopper and adjustable from without said flask when the stopper is in place to enable the trap to be located at the point desired in said restricted portion.

6. A stable extraction flask approximating the usual water bottle design, having a flat base enabling it to stand alone, and provided with a portion of relatively great volume and a restricted portion in communication therewith wherein is adapted to be located the plane of demarcation or common surface thus restricted of layers of liquids of different specific gravity contained in the flask, and a water bottle blow-off the end of whose blow-off pipe extends within said restricted portion, is there provided with a trap displacing liquid in said restricted portion and thereby further limiting the area of mutual contact of the layers, having a vent and an inlet opening located at the bottom of the upper layer closely adjacent the plane dividing said layers and to substantially the bottom of which the blow-off pipe extends.

7. A stable upright extraction flask having a flat base and an upper part of relatively great internal diameter and a part of restricted internal diameter below and in communication with it and wherein is designed to be located the common contacting surface of liquids of different specific gravity contained in said flask, and a water bottle blow-off whose blow-off pipe extends within said portion of restricted diameter and over whose end is slipped a trap consisting of a short tube closed at the bottom, having a vented cork or like stopper in its upper end, and an inlet at the level of the common surface or plane of demarcation of the meeting layers, said trap further displacing liquid in the portion of restricted diameter and reducing the area of common contact of the layers thereby promoting completeness of separation.

8. A stable upright extraction flask having an upper part of relatively great cross-sectional area and a part materially restricted in cross-sectional area below and in communication with said upper part and wherein is designed to be located the common contacting surface of liquids of different specific gravity contained in said flask, and a water bottle blow-off pipe which extends within said portion of restricted cross-sectional area and which carries at its lower end a liquid displacing structure having a concavity into which said lower end extends, said structure being in communication with the interior of the flask and adapted to receive the lighter liquid at substantially the plane of demarcation of the meeting layers, said structure by displacing liquid in the portion of restricted cross sectional area reducing the area of common contact of the layers and promoting completeness of separation.

In testimony whereof, I have signed this specification.

EDWARD L. WEBB.